May 6, 1924.
F. R. KLAUS
TIRE CARRYING RIM
Filed Nov. 19, 1920
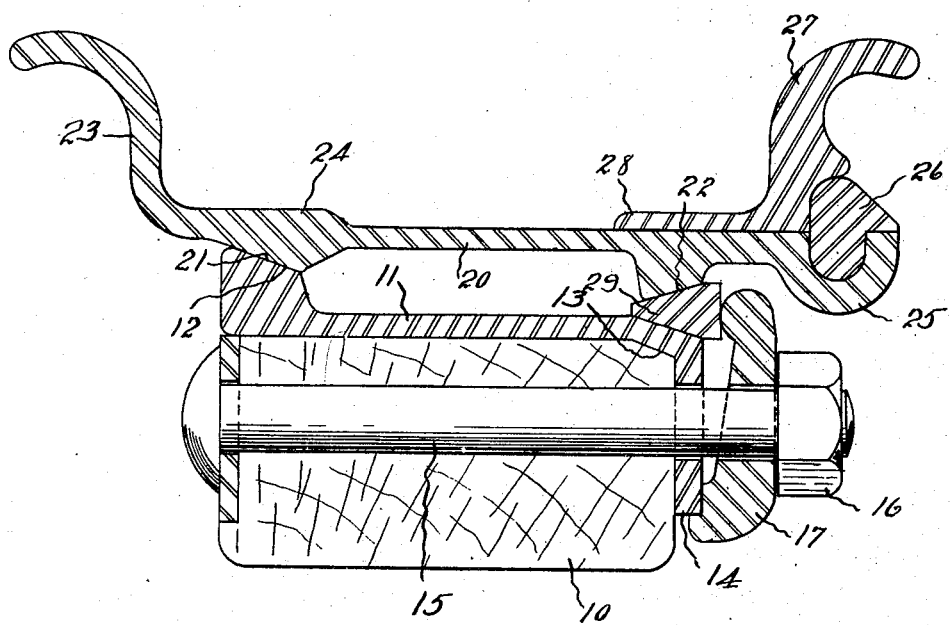
INVENTOR
Fred R. Klaus
BY Hull Smith Brock & West
ATTY'S Patented May 6, 1924.

1,493,040

UNITED STATES PATENT OFFICE.

FRED R. KLAUS, OF CLEVELAND, OHIO, ASSIGNOR TO THE HYDRAULIC STEEL COMPANY, OF CLEVELAND, OHIO, A CORPORATION OF OHIO.

TIRE-CARRYING RIM.

Application filed November 19, 1920. Serial No. 425,064.

*To all whom it may concern:*

Be it known that I, FRED R. KLAUS, a citizen of the United States, residing at Cleveland, in the county of Cuyahoga and State of Ohio, have invented a certain new and useful Improvement in Tire-Carrying Rims, of which the following is a full, clear, and exact description, reference being had to the accompanying drawings.

This invention relates generally to automobile tire carrying rims and more particularly to a demountable tire carrying rim having a detachable tire retaining flange, and one object of the invention is to provide a rim of this type in which the tire shoe can be more quickly and easily applied to and removed from the rim than with the types of rim now in use; and another object of the invention is to provide a rim of this type in which ample provision will be made for the placement of the inner tube and in which the internal tire pressure can be utilized in holding the detachable tire engaging flange in place.

With these objects in view the invention consists in the novel features of construction hereinafter fully described and set forth in the appended claim.

In the drawings forming a part of this specification, I have shown a transverse sectional view of a rim constructed in accordance with my invention and applied to the felly or fixed rim of an automobile wheel.

Referring to the drawing, 10 indicates the conventional wooden felly to which is affixed the metallic felly band 11 having the inclined land 12 at the rear or inner side thereof, and a beveled land 13 at the forward or outer side thereof, and the flange 14 which contacts with the outer or forward face of the wooden felly. Clamping bolts 15 are passed transversely or axially through the wooden felly and flange 14 and carry nuts 16 upon their outer threaded ends, and clamps 17 are also arranged upon said bolts and fulcrumed upon the inner edge of the flange 14 as most clearly shown. All of the parts thus far described are of the conventional type or construction.

The demountable tire carrying rim 20 is preferably made from a hot rolled section and is formed upon its inner face with the inclined ribs or lands 21 and 22, the rib 22 being of somewhat greater thickness than the rib 21, as most clearly shown. The tire carrying rim is formed with the integral tire engaging flange 23 upon the inner side thereof and the outer face of of the base of the rim is slightly elevated adjacent said tire engaging flange as most clearly shown at 24, this portion 24 being slightly elevated above the remaining portion of the base of the rim; and at the outer side of said rim, it is formed with the usual ring receiving groove 25 into which fits the locking ring 26, and which has engagement with the detachable tire engaging flange 27, said tire engaging flange being formed with an inwardly projecting foot piece 28 which rests upon the base of the rim and is of the same thickness as the elevated portion 24.

The outer faces of the elevated portion 24 and the foot piece 28 are in alignment with each other. The beads of the tire shoe (not shown) rest upon the elevated portion 24 and the foot piece 28, and the intervening space is left perfectly smooth and upon which the inner tube can firmly bear. The foot piece 28 being somewhat elongated as shown, has considerable internal pressure communicated thereto when the tire is inflated and consequently is firmly held in contact with the base of the rim and against the locking rim 26.

In applying the tire shoe to the rim, the flange 27 and rink 26 are of course removed and the shoe can be readily placed upon the rim base, the inner bead resting upon the elevated portion 24. The tire engaging flange 27 is then set in place, the foot piece 28 being forced beneath the outer bead and the locking ring 26 is then placed in the groove and brought into engagement with the detachable tire engaging flange, and when the tire is inflated, all of these parts will be securely interlocked.

The demountable tire carrying rim with the tire thereon is then placed upon the fixed rim of the wheel body, the interior rib 21 contacting with the inclined land 12 of the felly band and the wedge ring 29 is then inserted between the beveled edge 13 and the interior inclined rib 22 and the outer ends of the clamps 17 brought into engagement with said wedge ring and by tightening up the nuts 16, the clamps are forced against the ring causing the said ring to wedge firmly between the beveled edge of the felly band and the inclined rib of the tire carrying rim thereby securely fastening the demountable tire carrying rim upon the fixed rim of the wheel body.

When it is desired to remove the tire shoe from the demountable tire carrying rim the locking ring is first removed, (the tire having been deflated to a proper extent) and after the locking ring has been removed, the tire engaging flange 27 can be withdrawn and owing to the fact that the foot piece 28 has considerable thickness there will be that amount of space left between the bead and the base of the rim and inasmuch as the opposite side of the base is elevated somewhat as shown at 24 the tire shoe can be readily removed from the rim base and another shoe and tube placed thereon. The tire engaging flange and locking ring are then replaced and the tire inflated.

By constructing the various parts as herein shown and described, the rim as a whole is materially strengthened and furthermore is more easily applied to the fixed rim and owing to the elevated portion 24 and the laterally extending foot piece 28 the shoe is more easily placed upon or removed from the rim base.

Having thus described my invention, what I claim is:

A tire carrying rim comprising a base portion, the outer face of which is shouldered, and a tire engaging flange at the outer side of said shouldered portion of the base, the outer edge of the base of the rim having a ring receiving groove, a detachable tire engaging flange having an inwardly projecting foot-piece the inner face of which is flat and adapted to rest upon the base of the rim, the thickness of said foot-piece corresponding to the shoulder upon the opposite side of the base and a locking ring located in the groove and engaging said detachable flange and holding the same in place.

In testimony whereof, I hereunto affix my signature.

FRED R. KLAUS.